Figure 13:
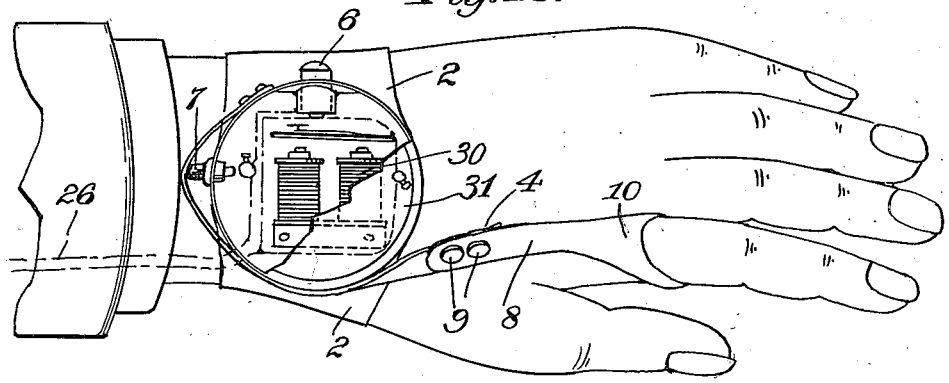

May 29, 1923.
A. R. FERGUSSON
1,457,023
AUTOMOBILE HAND SIGNALING DEVICE
Filed Oct. 5, 1920  3 Sheets-Sheet 1
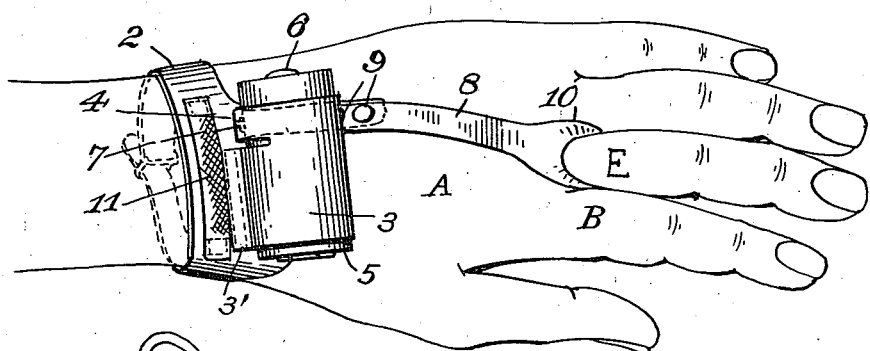
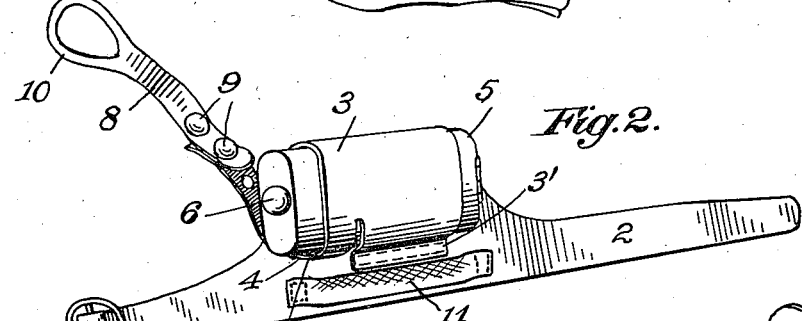
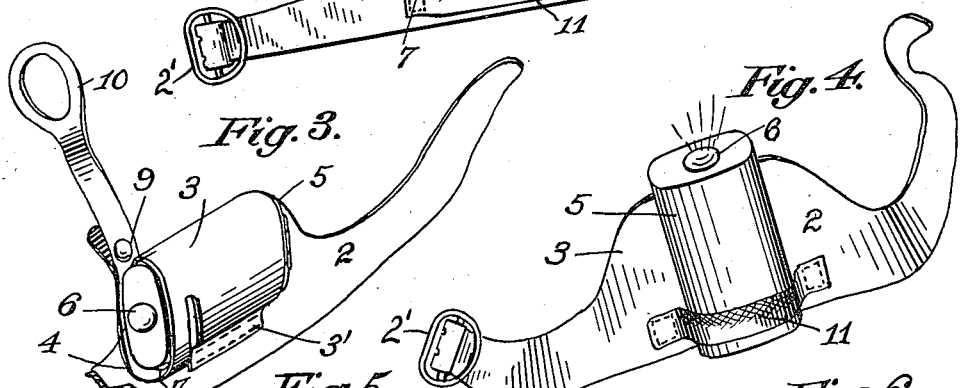
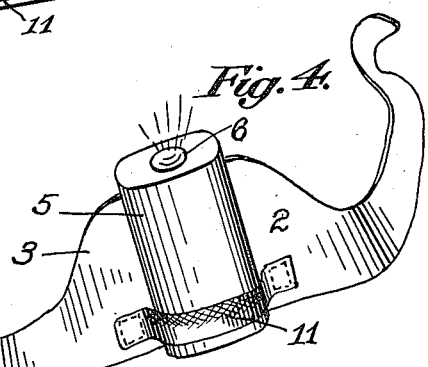
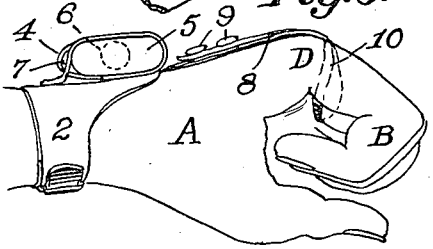
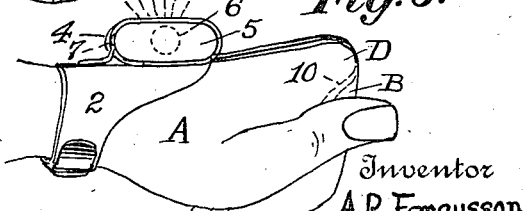
Inventor
A. R. Fergusson
By his Attorneys:
Weed&Gray

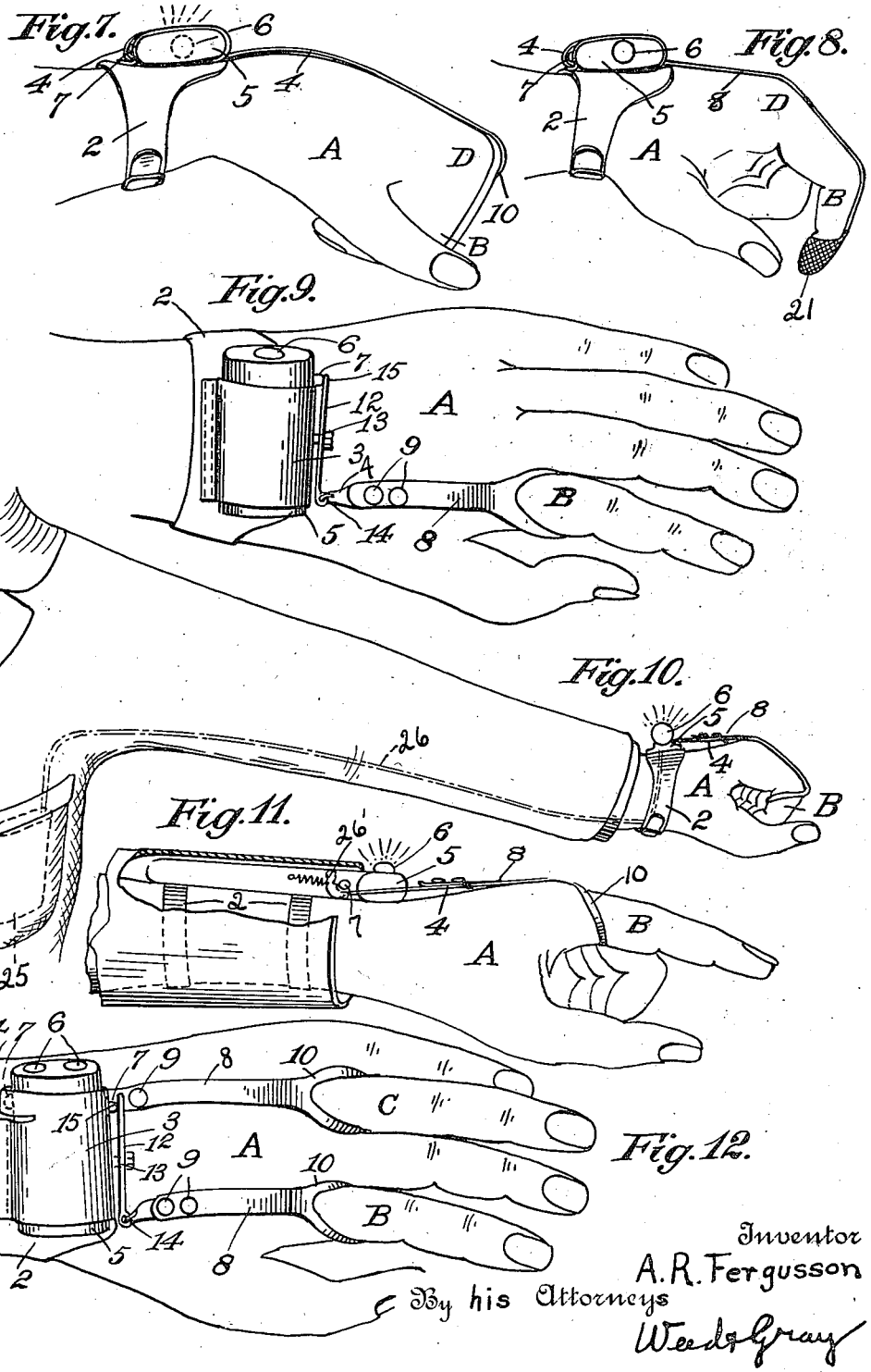

May 29, 1923. 1,457,023
A. R. FERGUSSON
AUTOMOBILE HAND SIGNALING DEVICE
Filed Oct. 5, 1920   3 Sheets-Sheet 3

Inventor
A. R. Fergusson
By his Attorneys
Weed & Gray

Patented May 29, 1923.

1,457,023

UNITED STATES PATENT OFFICE.

ALAN R. FERGUSSON, OF BUFFALO, NEW YORK.

AUTOMOBILE HAND SIGNALING DEVICE.

Application filed October 5, 1920. Serial No. 414,927.

*To all whom it may concern:*

Be it known that I, ALAN R. FERGUSSON, a citizen of the United States, residing at Buffalo, in the county of Erie and State of New York, have invented certain new and useful Improvements in Automobile Hand Signaling Devices, of which the following is a specification.

This invention relates to automobile hand signaling devices, and more particularly to a signal light or apparatus adapted to be attached to the back of the hand or the wrist and designed to be employed by the operator of a motor vehicle or the like at night for convenience in giving traffic signals without impairing the normal use of the hand or arm while operating the vehicle.

An object of this invention is to provide an economical, simple and effective apparatus readily adjusted to the hand or wrist and designed for use in conjunction with any standard commercial flash light or electric lamp, the switch thereof to be operated by the flexing of the fingers or wrist in a predetermined manner when the operator desires to extend his hand in order to signal the operator of other vehicles in the rear.

A further object of this invention is to produce a signaling device preferably comprising an electric lamp of any standard make provided with a tension finger band so positioned as to operate the electric switch and thereby actuate the signal device when one or more fingers of the hand or when the wrist is flexed, the angle of elevation formed by the bent fingers or wrist exerting tension on the band and actuating the switch. Thus by flexing one or more fingers separately or in unison it is possible to control one or a plurality of signals separately or in combination, and if desired, it is possible to flash a code by a series of quick movements of the fingers.

A further object of this invention is to produce a signaling device having a flexible holder or casing adjustable to the wrist and adapted to receive the flash light, bell or other signal having the usual switch button or the like, the device being actuated either by means of a tension band passing over the switch button and depressing the same when tension is exerted on the band by the finger; or by means of a lever, one end of which engages the button, the other end secured to a tension band connected to a finger, the button being depressed upon the application of tension to the band; or by means of a tension band connected directly to the switch lever which, when tension is applied to the band, is pulled out instead of pressed in thereby to actuate the signal.

A further object of this invention is to provide a signaling device wherein the electric lamp or the battery may be readily detached and replaced by others without necessitating the renewal of the entire device.

Figure 14:
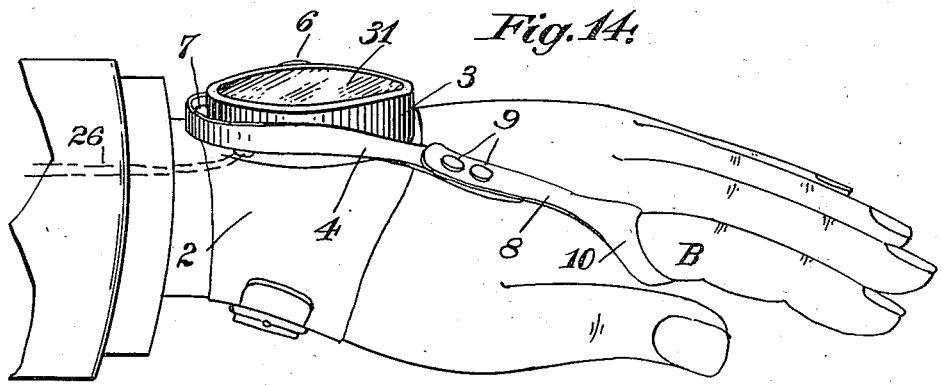

Other objects of this invention will appear during the course of the specification, reference being had to the accompanying drawings forming a part of this specification, wherein like reference characters designate similar parts in the several figures, and wherein Fig. 1 is a perspective view of my improved signaling device in a preferred form thereof; Fig. 2 is a view illustrating the device detached from the hand; Fig. 3 is a similar view taken from a different angle, certain parts being removed and broken away; Fig. 4 is a perspective view illustrating the use of the elastic band; Fig. 5 is a side view showing one position of the hand when the device is inoperative; Fig. 6 is a similar view illustrating the position of the hand when the device is operative; Figs. 7 and 8 are similar views showing other methods of operation of the device; Fig. 9 is a plan view showing another embodiment of my invention; Figs. 10, 11 and 12 are similar views illustrating further embodiments thereof; Fig. 13 is a plan view of a further embodiment of my invention; and Fig. 14 is a side view thereof.

Referring more particularly to Figs. 1 to 7 inclusive, I have illustrated therein a preferred embodiment of my invention, which comprises a flexible wrist band 2, provided with any suitable means for adjusting it to the wrist such as by a buckle 2'. The band 2 has attached thereto a holder or casing 3, which may be of any suitable material, such as leather, and designed and adapted to receive an electric signal lamp or other signal device 5 having the usual switch or switch button 7. The electric lamp 5 may be any suitable standard or commercial flash light. In order to actuate the signal light 6 as in Fig. 6, I provide a tension means comprising a band 4 preferably integral with the holder 3. In order to make the same adjustable, a second tension band 8 having adjustable means 9 and provided with a loop 10 adapted to be connected to the finger E of the hand is provided. This adjustable means may comprise a plurality of snap fasteners 9, one thereof adapted to be connected as desired to a cooperating part carried by the band 4. By adjusting the tension band 8 to fit the finger E in such manner as will permit the band 4 to pass over and lightly engage the switch 7 so that when the hand A is in a position to clasp the steering wheel of the vehicle as illustrated in Fig. 5, the switch will not be pressed in by the tension band 4 to actuate the light. When it is desired to signal an operator of a vehicle in the rear the arm may be extended and it is merely necessary to close the hand tightly so as to abnormally flex the finger E (see Fig. 6) or the wrist, as in Fig. 7. Due to the fact that the tension band 8, when properly adjusted to the finger E passes over the knuckle of the hand, it will be readily seen that upon flexing the hand in an extreme manner, as illustrated in Fig. 6 or Fig. 7, the knuckle will be elevated to such a position as to exert sufficient tension on the tension bands 8 and 4 as to press in the switch 7 and thus actuate the light. In this embodiment of my invention, as illustrated in Figs. 1 to 7, the signaling device is so positioned on the hand that upon extending the arm with the palm of the hand down, the light 6 will be plainly visible to any person in the rear of the vehicle.

As illustrated in Fig. 8, it may be desirable to attach the tension band 8 to a finger tip or a glove tip 21 instead of providing a loop 10 adapted to surround the finger at the base thereof, as hereinbefore described. Furthermore it is readily apparent that the tension means 4 and 8 may be if preferred, located at the opposite side of the flexible holder 3, so that the lamp 5 may be so positioned therein as to have the bulb 6 pointing in the opposite direction. In this manner, therefore, in order to signal an operator of a vehicle in the rear the arm would be extended laterally with the palm upwards. In this embodiment, although the tension is drawn from the tip of the finger instead of the base of the finger, the operation of the device would be substantially the same as that illustrated in the remaining figures of the drawings, that is to say, by an abnormal or extreme flexure of the finger B or of the wrist an elevation of the knuckle D will be created and sufficient tension will be transmitted to the tension means 4 as to press in the switch button 7, and thus actuate the light 6.

In the embodiment illustrated in Fig. 9, I have substituted for the tension band surrounding the switch button a lever for operating the switch 7 to actuate the device. The tension band 8 connected to the finger B is adjusted to the tension band 4, the latter being connected to one end of a lever 12. This lever is held in position by means of a set screw 13 secured to the metal casing of the flashlight and passing loosely through a hole in the lever 12, the hole being large enough to permit sufficient oscillating movement of the lever relatively to the switch button 7. The opposite end 15 of the lever 12 is adapted to engage the switch 7 and upon the application of tension to the tension means 8, as hereinbefore described, the end 15 of the lever 12 will be moved to operate the switch.

In Fig. 10 I have shown a construction wherein for convenience the battery 25 of the lamp may be carried in the coat pocket. Suitable wires 26 are provided for transmitting the current to the lamp 6 received in the holder 5 attached to the adjustable wrist band 2. I employ the tension bands 4 and 8 connected to the finger B in the same manner as hereinbefore explained, and so connected to the switch of the electric lamp 6 that the same will be pulled out to actuate the device upon flexing the fingers or hand in a predetermined manner. The band 4 may of course be connected to the switch in any preferred manner or may be connected to actuate the same as by means of a lever as shown in Fig. 11. If it is desired to employ the larger or more powerful types of flash light, the same may be attached to the wrist inside the coat sleeve (see Fig. 11) by means of the usual adjustable bands 2. In this embodiment, the tension band 4 is connected through adjustable band 8 to the finger B by means of a loop 10, and may, for instance, be connected to a spring actuated lever 26', which, upon application of tension to the bands 4 and 8 will be moved to operate the switch button 7.

In many cases I have found it desirable to employ a plurality of signal lights usually of different colors, and in such cases I provide preferably the construction illustrated in Fig. 12, wherein the adjustable wrist band 2 and the holder 3 are similar in all respects to those illustrated in Figs. 1 and 2. In this case however, the lamp 5 provided with two lights 6 of different colors, each having a switch 7, is received in the holder 3. A lever 12 operated in substantially the same maner as the embodiment illustrated in Fig. 9, is adapted to actuate one of the switches 7. The other switch 7 is controlled by a tension band 4 surrounding the same and adjusted to a tension band 8 connected with the finger C by a loop 10. It will be readily seen therefore, that in the operation of the device illustrated in Fig. 12 by flexing either finger B or C separately or in unison, it is possible to control the lights 6 separately or in combination, and hence it is possible for the operator of a vehicle to transmit a code of signals by a series of quick movements of the fingers B and C.

It will be readily seen therefore, that I have provided a signaling device which may be readily adjusted to the hand of the operator of the vehicle and conveniently carried without impairing the normal use of the hand or arm in the operation of the vehicle. One of the essential features of my invention is the use of a tension band connected to the switch of the signaling device and so adjusted to a finger of the hand that the operator of the vehicle may clasp the steering wheel thereof without actuating the light, and yet instantaneously actuating the same at will by an abnormal or extreme flexing of the fingers or wrist. Thus, when my device is properly adjusted on the hand or wrist, it is necessary to flex the fingers or wrist in an extreme manner to actuate the device, and hence when the fingers are grasping the steering wheel, the flexure thereof will not be sufficient to result in the actuating of the device.

The construction and shape of the adjustable wrist band 2 is such that it will carry the lamp 5 as far forward as possible on the hand, thus preventing the possibility of the coat sleeve interfering with the effectiveness of the signal when operated. Furthermore the wrist band hugs the hand in such a manner that when the finger E is flexed or bent to a position substantially at right angles to the longitudinal axis of the hand (see Fig. 6) and a natural elevation of the knuckle over which the band 8 passes is created, the device does not yield to the pull of the band 8. The latter is sufficiently wide so as to effectually cover the knuckle and derive full benefit of the tension exerted by the knuckle upon elevation thereof.

I have found in practice that my invention may be conveniently employed for a variety of purposes, such as, for instance, in providing light for performing repair work at night. In order to accomplish this the adjustable wrist band 2 is provided with a resilient holder or band 11 of any suitable material attached longitudinally thereof (see Figs. 1, 2 and 4). When it is necessary to provide a light for repair work, or other purposes, the lamp 5 may be inserted in the holder 11 (see Fig. 4) and by means of the usual sliding lever engaging the switch button, common in commercial flash lights, a continuous or steady light pointing in the direction of the fingers may be obtained without impairing the functions and uses of the hand during the work.

With reference to Figs. 13 and 14, it will be seen that I have illustrated a further adaptation of my improved hand signaling system wherein the casing or holder 3 of suitable construction and attached to the adjustable wrist band 2 is adapted to receive a plurality of signal devices comprising in this case preferably a flash lamp 6, and an electric buzzer 30, or other similar electric sound producing device. The battery may conveniently be carried in the coat pocket, for instance, as in Fig. 10 with wires 26 completing the circuit in any suitable manner through the buzzer 30 and electric lamp 6. In this case, the switch 7 operates the two signal devices simultaneously although a plurality of switches as illustrated in Fig. 12 may be employed for selectively operating the signal devices. I provide the tension band 4 surrounding and engaging the switch 7 and adjusted to the band 8 as hereinbefore described, the latter being of sufficient width adjacent the neck to cover the same. In this embodiment the operation is similar to that hereinbefore explained. Upon flexing the hand in a predetermined manner as by an abnormal elevation of the knuckle, tension is applied to the bands 8 and 4, causing the switch 7 to be pressed in to actuate the signals. The casing 3 may desirably be provided with a mirror 31 by means of which the operator may conveniently observe objects in the rear.

It is readily apparent that my improved signaling device attains certain distinct and practical advantages through convenience and facility of operation without impairing the normal uses of the fingers, hand or arm. Furthermore, it is important that a signaling device of this kind shall be so constructed as to obviate any accidental or unintentional lighting of the flash light due to the fact that the life of the batteries of the flash lights is very short and hence inadvertent or accidental lighting thereof will result in waste, inconvenience and possible accidents.

Although I have described my invention in its preferred forms, I desire it understood that I do not limit myself to the exact construction illustrated and described, except in so far as defined in the appended claims.

I claim as my invention:

1. In a signaling device, an adjustable wrist band, a casing attached thereto and adapted to receive an electric flashlight having a switch, tension means releasably engaging said switch and adapted to be connected to a finger of the hand, whereby upon movement of said tension means in a predetermined direction said switch will be actuated to light the flashlight.

2. In a signaling device, an adjustable wrist band having a flexible casing attached thereto for receiving an electric flashlight provided with a switch, means connected to said casing and embracing the flashlight for operatively engaging said switch, and means for connecting said last means to a finger of the hand.

3. In a signaling device, a holder adapted to receive an electric flashlight provided with a switch and having a tension band embracing said flashlight and engaging the switch thereof, means for connecting said band with a finger of the hand whereby upon applying tension thereto said switch will be actuated.

4. In a signaling device, a holder adapted to receive an electric flashlight provided with a switch and having a tension band embracing said flashlight and engaging the switch thereof, and means comprising an adjustable loop-formed member for connecting said band with a finger of the hand whereby upon applying tension thereto said switch will be actuated.

5. In a signaling device, an adjustable wrist band provided with a holder adapted to receive an electric flashlight provided with a switch, a tension band encompassing said flashlight and engaging the switch thereof, and means for connecting said hand with a finger of the hand whereby upon applying tension thereto said switch will be actuated.

6. In a signaling device, an adjustable wrist band provided with a holder adapted to receive an electric flashlight provided with a switch, a tension band encompassing said flashlight and engaging the switch thereof, and means comprising an adjustable loop-formed member for connecting said band with a finger of the hand whereby upon applying tension thereto said switch will be actuated.

7. In a signaling device, a holder adapted to receive an electric flashlight having a switch, a tension band for operating said switch and having means for connection with a finger of the hand, whereby upon a predetermined flexing of the finger to create a tension in said tension band said switch will be actuated.

8. In a signaling device, a flexible wrist band, a flexible holder adapted to receive a flashlight having a plurality of lights and a plurality of switches, a tension member attached to said holder and engaing a switch, a lever having a part thereof engaging a switch, a second tension member connected to said lever, said tension members having means for connection with fingers of the hand, whereby upon movement of the hand in a predetermined manner said lights will actuated.

9. In a signaling device, an adjustable holder adapted to receive an electric flashlight having a switch, a lever having a part thereof cooperating with said switch and provided with a tension member adapted to be connected to a finger of the hand, and means whereby upon movement of the hand in a predetermined manner said lever will be operated to actuate said switch.

10. In a signaling device, a flexible wrist band, a resilient holder attached to said wrist band longitudinally thereof and adapted to receive an electric flashlight, a casing attached to said wrist band and provided with a tension member intergral therewith, and adjustable means for connecting said tension member with a finger of the hand.

Signed at Buffalo, New York, this 28th day of September, 1920.

ALAN R. FERGUSSON.